Patented Apr. 26, 1932

1,855,355

UNITED STATES PATENT OFFICE

HARRY KLOEPFER, OF FRANKFORT-ON-THE-MAIN, GERMANY, ASSIGNOR TO DEUTSCHE GOLD- UND SILBER- SCHEIDEANSTALT, VORMALS ROESSLER, OF FRANKFORT-ON-THE-MAIN, GERMANY, A CORPORATION

PROCESS FOR THE PURIFICATION OF GASES

No Drawing. Application filed January 30, 1928, Serial No. 250,716, and in Germany February 1, 1927.

The present invention relates to a process for the purification of gases or gas mixtures such as hydrogen, methane or the like which are inert or form relatively unstable compounds with alkali metals, by which moisture, oxygen, carbon monoxide, sulphur compounds, iron carbonyl and such like admixtures are removed. The invention consists in the application of metal such as metallic sodium or mixtures of several alkali metals, for instance sodium and potassium as purifying agent in a specially suitable form.

It is known, that alkali metals or compounds of alkali such as alkali metal amides which are capable of combining with the said impurities may be used for the purification of such gases especially of hydrogen. According to my invention I use for the treatment for purification of the gases for instance hydrogen alkali metal which is distributed over and mixed with solid diluting or distributing agents. According to my invention I use such distributing agents as will remain solid at the temperatures at which the treatment of the gas to be purified takes place. Distributing agents of this kind are, for instance, common salt, soda carbonate, wood charcoal and the like. The distribution of the alkali metal, for instance, metallic sodium may be achieved by grinding the said distributing agents at ordinary temperature in an indifferent atmosphere of for instance hydrogen nitrogen or the like in a rotary device such as, for instance a rotary mill taking a proportion of for instance 25 to 30% of metallic sodium to 75 to 70% of diluting agent.

I choose the kind of diluting agent for the alkali metal in accordance with the nature of the admixtures which have to be removed from the gas to be purified. For instance, if I desire to remove carbon monoxide from hydrogen I take with advantage soda carbonate as diluting agent. Having mixed this with metallic sodium the latter is converted during the process of purification into sodium carbonate by the carbon monoxide. Thus, when the metallic sodium is used up through the absorption of carbon monoxide and after the carbon which during the reaction is separated has been removed, for instance, by ignition, a residue of pure soda carbonate is obtained which may be utilized again for the dilution of fresh sodium metal, or to any other purpose.

The temperature at which the treatment takes place depends on the nature of the impurities to be removed. Thus, for instance, admixtures of moisture, oxygen or the like may be removed at ordinary room temperature or at slightly raised temperatures whilst the removal of other impurities such as for instance carbon monoxide, sulphur compounds and others require higher temperatures which generally exceed 200° C. If admixtures are present which combine with the alkali metal utilized partly at lower and partly at higher temperatures several vessels for the treatment may be arranged one after the other in such a manner that for instance in the first the impurities which are removed at ordinary temperature are retained and in the following vessels the complete purification at higher temperatures is achieved.

In order to purify, for example, hydrogen I bring for instance the gas at temperatures above 450° C. into intimate contact with the finely distributed sodium metal, said temperature being, of course, below the melting point of the distributing material. This can be done for instance with application of a rotary device such as a drum, tube or the like. These rotary devices have with advantage a small diameter and contain internally appliances for carrying the solid purification material along such as longitudinal ribs or the like. The rotary device may be heated to the temperature of 450° C. by any suitable means either externally for instance by gas heating or for instance internally by radiation using for example an electrical heating equipment. Another way of heating up to the required temperature is to pass the hydrogen previously before entering the purification equipment through chambers or apparatus where it is heated to the temperature desired. The obnoxious impurities are easily and completely taken up when the gases are passed over and through the solid purification material and a hydrogen of very great purity which is especially suitable, for instance, for catalytic purposes is obtained. When working at temperatures below 460° C. such as for instance between 430 and 300° C. the impurities are also removed by combination with the finely distributed alkali metal, but in the meantime the alkali metal is converted into a relatively unstable alkali metal hydride. Hence the process according to my invention may also be carried out by using the alkali metal distributed over solid diluting agents at temperatures at which either immediately or later on alkali metal hydride is formed. When the purification is completed the quantities of hydrogen combined with the alkali metal in the form of a relatively unstable alkali metal hydride may be liberated and thus regenerated, by heating to a higher temperature. In this way a hydrogen of especially pure state is obtained whilst on the other hand the alkali metal in a fine distribution upon the supporting and distributing material remains behind which may be used again for purification purposes.

What I claim is:

1. A process for purifying hydrogen comprising contacting the gas with a mixture containing metallic sodium in a fine state of division diluted with soda carbonate at a temperature from 300° C. up to the melting point of said soda carbonate.

2. A process for purifying hydrogen which consists in contacting the gas with a mixture obtained by grinding sodium metal with common salt at a temperature from 300° C. up to the melting point of said common salt.

3. A process for purifying hydrogen comprising contacting the gas at a temperature at which hydrogen forms relatively unstable compounds with alkali metals or does not combine to an appreciable degree with alkali metals, with a mixture obtained by grinding up 25 parts of sodium metal with 75 parts of an indifferent distributing material remaining solid at the temperature utilized.

4. A process for purifying hydrogen comprising contacting the gas at a temperature at which hydrogen forms relatively unstable compounds with alkali metals or does not combine to an appreciable degree with alkali metals, in a rotary device with a mixture obtained by grinding metallic sodium with indifferent distributing material remaining solid at the temperature of reaction.

5. A process for purifying gases which are inert to or form relatively unstable compounds with alkali metals, comprising contacting said gases with a mixture containing metallic sodium in a fine state of division diluted with soda carbonate, at a temperature between room temperature and the melting point of said soda carbonate.

6. A process for purifying gases which are inert to or form relatively unstable compounds with alkali metals, comprising contacting said gases with a mixture obtained by grinding sodium metal with common salt, at a temperature between room temperature and the melting point of said soda carbonate.

Signed at Frankfort a/M. Germany this 11th day of January, A. D. 1928.

HARRY KLOEPFER.